United States Patent
Lin et al.

(10) Patent No.: US 8,339,072 B2
(45) Date of Patent: Dec. 25, 2012

(54) SINGLE GENERAL PURPOSE INPUT/OUTPUT (GPIO) PIN MOTOR CONTROL CIRCUIT

(75) Inventors: Gaile Lin, Shenzhen (CN); Guoquan Li, Sihui (CN); Hong Guan, Shenzhen (CN)

(73) Assignee: CSR Technology Inc., Sunnyvale, CA (US)

( * ) Notice: Subject to any disclaimer, the term of this patent is extended or adjusted under 35 U.S.C. 154(b) by 74 days.

(21) Appl. No.: 12/299,241

(22) PCT Filed: Jun. 12, 2008

(86) PCT No.: PCT/CN2008/001180
§ 371 (c)(1),
(2), (4) Date: Oct. 31, 2008

(87) PCT Pub. No.: WO2009/132481
PCT Pub. Date: Nov. 5, 2009

(65) Prior Publication Data
US 2011/0031905 A1    Feb. 10, 2011

(30) Foreign Application Priority Data
Apr. 28, 2008  (CN) .......................... 2008 1 0091292

(51) Int. Cl.
*G06F 13/00*  (2006.01)

(52) U.S. Cl. ............ 318/3; 345/536; 708/174; 710/100; 710/107; 703/25; 235/61 PM

(58) Field of Classification Search .............. 318/3, 494, 318/490; 345/536–538; 708/146–165, 167–174; 710/31–35, 100, 104, 107–112; 235/61 PM
See application file for complete search history.

(56) References Cited

U.S. PATENT DOCUMENTS

| | | | |
|---|---|---|---|
| 6,611,117 B1* | 8/2003 | Hardt | 318/400.22 |
| 6,653,810 B2* | 11/2003 | Lo | 318/569 |
| 6,766,401 B2 | 7/2004 | Bonomo et al. | |
| 2002/0093303 A1* | 7/2002 | Lo | 318/569 |

(Continued)

FOREIGN PATENT DOCUMENTS
CN    1904830 A    1/2007
KR    20050059444 A  *  6/2005
KR    1020050059444 A    6/2005

OTHER PUBLICATIONS

International Search Report/Written Opinion dated Feb. 5, 2009, in foreign counterpart application publication No. CN2807650 published Aug. 16, 2006, 10 pgs.

*Primary Examiner* — Eduardo Colon Santana
(74) *Attorney, Agent, or Firm* — Pillsbury Winthrop Shaw Pittman LLP

(57) ABSTRACT

System and method for operating a motor using a single general purpose input/output (GPIO) pin of a controller. In one embodiment, a control circuit may include a first terminal coupled to a GPIO pin of a controller. The first terminal can be configured to receive, and output, at least one or more signals. The control circuit may include a plurality of elements coupled to the first terminal, and motor driver circuit output terminal, such that the control circuit may be configured to output one more control signals to the motor driver circuit output terminal for control the motor driver circuit. Motor driver control signals may be based, at least in part, on one or more signals received from the first terminal.

20 Claims, 3 Drawing Sheets

U.S. PATENT DOCUMENTS

2003/0154331 A1 8/2003 Bader et al.
2006/0168374 A1 7/2006 Wray et al.
2010/0290145 A1* 11/2010 Ahmad et al. .................. 360/31
2011/0095877 A1* 4/2011 Casparian et al. ......... 340/407.2

* cited by examiner

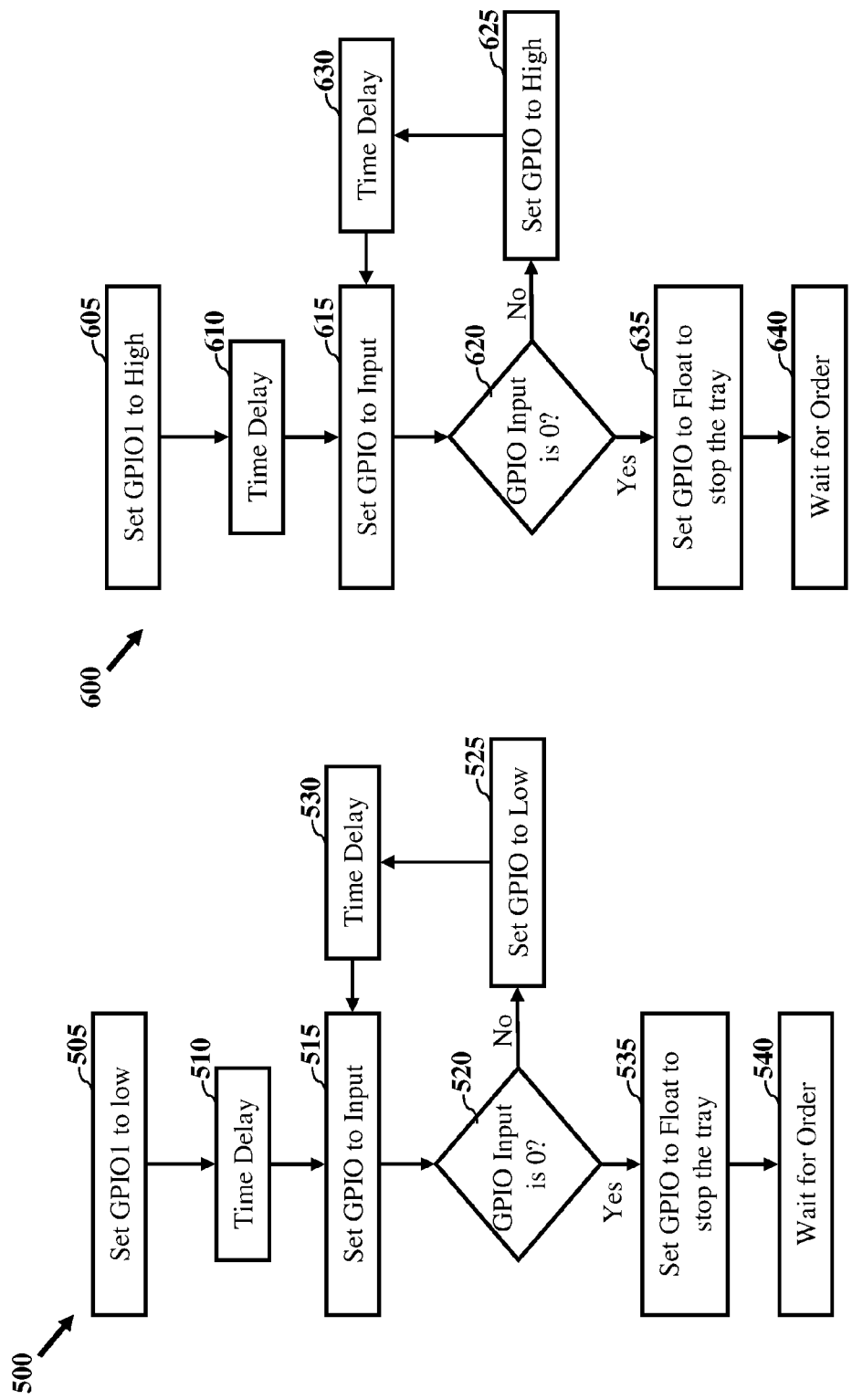

a# SINGLE GENERAL PURPOSE INPUT/OUTPUT (GPIO) PIN MOTOR CONTROL CIRCUIT

CROSS REFERENCE TO RELATED APPLICATION

This application claims priority to International Application No. PCT/CN2008/001180 filed Jun. 12, 2008, which claims benefit to Chinese Application No. 200810091292.9 filed Jun. 18, 2008, the disclosures of which are expressly incorporated by reference herein.

FIELD OF THE INVENTION

The present invention relates in general to motor control and more particularly to a circuit for controlling a motor using a single general purpose input/output (GPIO) pin.

BACKGROUND OF THE INVENTION

In order to reduce costs, the development of chipsets for multimedia applications has led to a reduction in the number of pins in processing chips. Conventional 208 and 256 pin chip configurations are being replaced with 128 pin chips. As a result, the number of pins available to perform chip functions is reduced. Additionally, allocating pins for multi-media applications may present challenges for many applications once pins for necessary functions are allocated. With respect to multimedia chipsets for example, pins may be allocated for necessary functions including power supply, ground, video, audio, etc. Implementing additional chip functions, such as a high-definition multimedia interface (HDMI), may pose challenges when allocating available pins.

In the media player industry there is a desire to support many audio and video features within media players. Inclusion of features like SCART and 6 channel audio into multimedia chipsets is desired. Accordingly there is a need for a way to utilize a reduced number of pins for multimedia chipsets.

Conventional configuration packages for disc tray control may employ up to 4 pins of a motor control apparatus. However, such a configuration for motor control may not be an acceptable solution for the reduced-pin packages described above. One conventional approach may be to include an external pin extender to increase the pin resources. However, this approach can result in increase board size and increased cost. As such, there is a need to reduce the pin count configuration for motor control and/or multimedia functions in general.

SUMMARY

Disclosed and claimed herein is a system and method for operating a motor using a single general purpose input/output (GPIO) pin of a controller. In one embodiment, a control circuit is provided having a first terminal coupled to a GPIO pin of a controller. The first terminal can be configured to receive and output at least one or more signals. The control circuit may include a motor driver circuit output terminal coupled to a motor driver circuit. The control circuit is configured to output one or more control signals to the motor driver circuit output terminal to control the motor driver circuit. Motor driver control signals may be based, at least in part, on one or more signals received from the first terminal.

Other aspects, features, and techniques of the invention will be apparent to one skilled in the relevant art in view of the following detailed description of the invention.

BRIEF DESCRIPTION OF THE DRAWINGS

FIG. 5 depicts a process for opening a tray according to one or more embodiments of the invention; and FIG. 6 depicts a process for closing a tray according to one or more embodiments of the invention.

DESCRIPTION OF EMBODIMENTS

Figure 1:
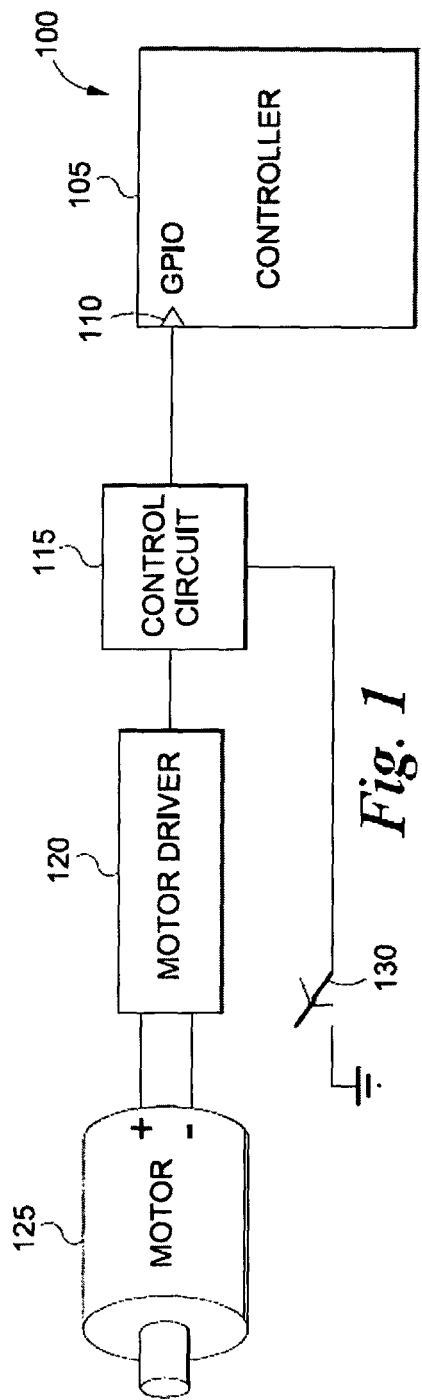
FIG. 1 depicts a simplified block diagram of a motor control system according to one or more embodiments of the invention.

One aspect of the present invention is directed to reducing the number of output pins required for a controller to operate a motor. In one embodiment, the invention relates to a control circuit which may be coupled to a controller for operation of a motor. In a further embodiment, the controller may include a GPIO pin coupled to the control circuit. According to another embodiment, the control circuit may include a plurality of terminals to output motor control signals based on one or more signals received from the controller. The control circuit may further be configured to provide one or more signals to the controller. In one embodiment, the controller may be used to operate a motor for use in an electronic machine including but not limited to a compact disc player, video disc player, media player, etc. In certain embodiments, the motor may be used to operate a component of an electrical machine, such as a disc tray. For example, in one embodiment the control circuit may be used to control a motor for opening and closing a tray on a media player. It may also be appreciated that the control circuit may be configured to control opening and/or closing of components in a multitude of forms (e.g., doors, windows, curtains, etc.) To that end, a control circuit may be provided for control of a motor, using a single GPIO pin of a controller, for one or more functions.

Another aspect of the invention relates to a system for controlling a motor. In one embodiment, the system may include a control circuit coupled to a single GPIO pin of a controller and a motor driver circuit. The control circuit may be configured to provide one or more output signals to the motor driver circuit based on control signals received from the GPIO pin of the controller. According to another embodiment, the motor driver circuit can be coupled to a motor for control of one or more components of an electronic device such as a media player. In certain embodiments, the system may further be configured to control a motor for opening and closing a media player tray.

According to another aspect of the invention, a process may be provided for controlling operation of a motor to open and close a media player tray. In one embodiment, the process may include setting a GPIO of a controller to output one or more signals for a first period of time and setting the GPIO to receive one or more input signals for a second period of time. In certain embodiments, the controller may be configured to output one or more signals for controlling actuation of the motor when the GPIO pin is set to output one or more signals. Similarly, the controller may be configured to receive one or more signals useable to control the motor when the GPIO pin is set to receive input signals. It may also be appreciated that the GPIO pin may be set in a floating state. In one embodiment, a floating state may relate to setting a GPIO pin such that the motor is not activated. In that fashion, control of the motor to open, or close, the tray may be based on one or more signals received, or output by a GPIO pin. According to another embodiment, the process may include stopping the motor when the tray has reached a particular position. It should also be appreciated that the process may used to control a motor for additional applications and is not be limited to control of a media player tray.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, etc. The code segments may be downloaded via computer networks such as the Internet, Intranet, etc.

While FIGS. 1-6 are described in relation to media players, it should be appreciated that the principles of the invention are equally applicable to other applications and should not be limited to the preferred embodiments.

Referring now to the drawings, FIG. 1 illustrates a simplified block diagram of a system for controlling a motor. As shown, system 100 includes control circuit 115 coupled to controller 105 and motor driver 120. In one embodiment, controller 105 may be used to control an electrical machine such as a compact disc player, video disc player, media player in general, etc. As such, controller 105 may include logic for processing at least one of audio, video and data in general. Further, controller 105 may be configured to control motor 125 to operate a component of an electrical machine. According to one embodiment, controller 105 can be any type of processor such as a microprocessor, field programmable gate array (FPGA), microcontroller unit (MCU) and/or application specific integrated circuit (ASIC). In one embodiment, controller 105 may include a plurality of GPIO pins. Each GPIO pin may be used to output and/or receive one or more signals for controller 105. As shown in FIG. 1, control circuit 115 is coupled to a single GPIO 110 of a controller 105.

According to one embodiment, controller 105 may include a plurality of GPIO pins. However, according to another embodiment of the invention, only a single GPIO pin may be required to control operation of motor 125. As such it may be appreciated that GPIO pin resources of controller 105 may be extended. It may also be appreciated that GPIO resources may be extended without the use of a GPIO pin extender. As such, a single GPIO pin for control of motor 125 may enable use of smaller board size requirements, controllers having lower pin counts and possibly allow for more applications to be supported by controller 105.

According to one embodiment, controller 105 may be configured to receive and output one or more signals at GPIO pin 110. In one embodiment, controller 105 may be configured to set GPIO pin 110 as one of an input or output. According to another embodiment, when set as an output by controller 105 at least one of a high voltage or low voltage signal may be provided at GPIO pin 110. A high voltage may be associated with a voltage level above a predefined threshold such to activate the motor in a first direction. The low voltage may be associated with a voltage signal below a predetermined threshold to activate the motor in another direction. According to another embodiment, GPIO pin 110 may be set as floating point by controller 105. Floating point may correspond to a voltage level between the low and high voltage thresholds such that a motor will not be activated. Output of the controller 105 may be applied to control circuit 115.

As shown in FIG. 1, control circuit 115 is coupled to motor driver circuit 120. In one embodiment, motor driver circuit 120 may be configured to provide one or more output signals to activate motor 125. In one embodiment, motor 125 relates to at least one of a DC motor, brushed motor, brushless motor, and motor in general. Activation and/or operation of motor 125 may be based on one or more signals applied by control circuit 115 to motor driver circuit 120.

According to another embodiment, control circuit 115 may be coupled to switch 130 for control of motor 125. The state of switch 130 may be employed in control of motor 125. For example, when used to control the operation of a disc tray, the state (i.e., open or closed) of switch 130 may indicate that the disc tray is in a predetermined position, which may relate to an open or closed state of the tray. As such, based on the sate of switch 130, control circuit 115 may output one or more signals to halt operation of motor 125. In one embodiment, signals to halt the motor may also be based on a detection of the state of switch 130 by controller 105.

Figure 2:
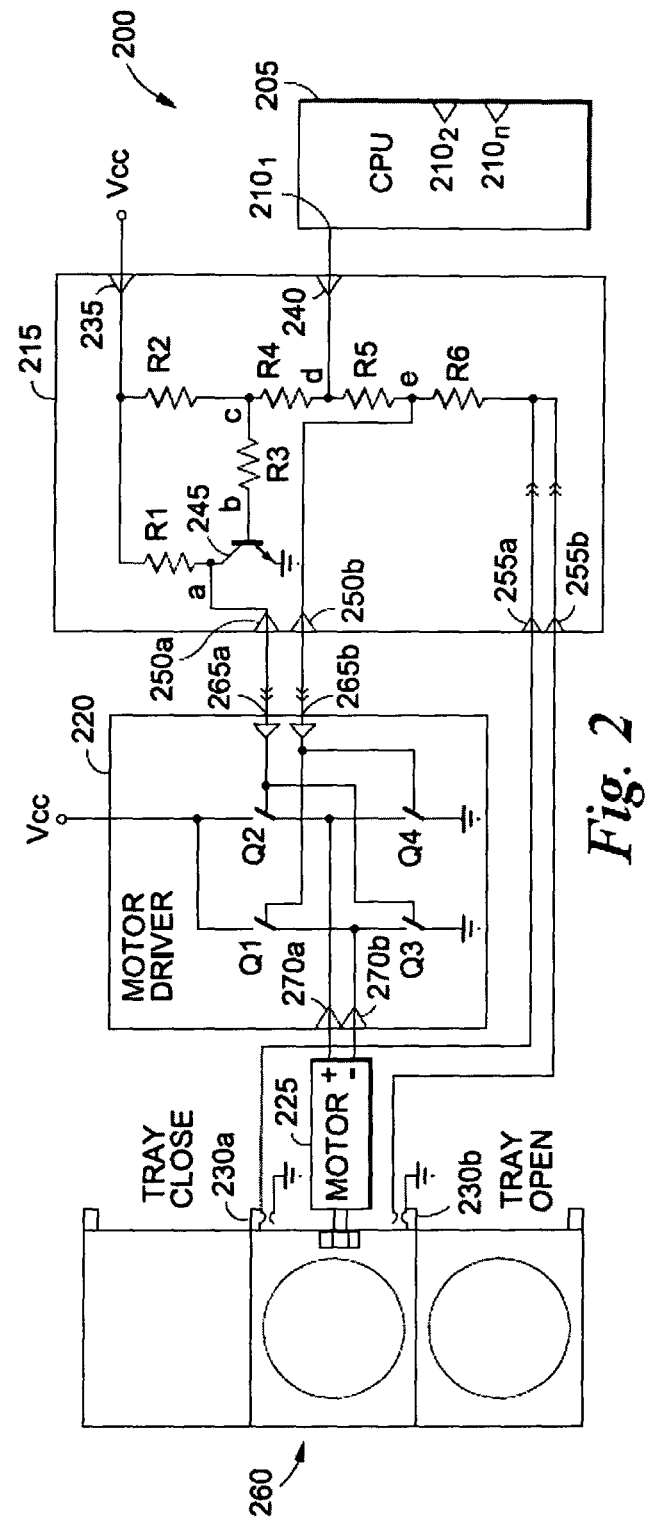
FIG. 2 depicts a simplified block diagram of one embodiment of the system of FIG. 1.

Referring now to FIG. 2, a simplified block diagram is shown of another embodiment of the system of FIG. 1. As shown in FIG. 2, system 200 may include a motor 225 to open and/or close tray 260. In one embodiment, tray 260 may relate to a media tray used to load discs into at least one of a video disc player, compact disc player and media player in general. Operation of motor 225 may be based on one or more output signals provided by GPIO $210_1$ of controller 205 to control circuit 215. Controller 205 can include a plurality of GPIO pins $210_1$-n which may be used to output or receive one or more signals. However, only one GPIO pin, GPIO pin $210_1$ is required to operate motor 225 according to one embodiment of the invention. It may be appreciated that using a single GPIO may reduce the overall pin count of controller 205 and may be advantageous for extending GPIO pin resources of controller 205.

According to one embodiment, operation of motor 225 may be based, at least in part, on a pin setting state and signal level of GPIO pin $210_1$. For example, GPIO pin $210_1$ may be set as one of an output and input. Further, signals applied by controller 205 may activate or stop motor 225. Similarly, one or more signals detected at GPIO pin $210_1$ may be read by controller 205 to halt operation of motor 225. GPIO pin $210_1$ of controller 205 may be coupled to a first terminal 240 of control circuit 215. When GPIO pin $210_1$ is set as an output pin, one or more signals may be applied to control circuit 215. Alternatively, when GPIO pin $210_1$ is set to receive input signals, one or more signals may be received by control circuit 215. According to another embodiment, controller 205 may set GPIO pin $210_1$ as an input, or output, for predetermined periods of time. Timing of input and output will be described in more detail below with respect to FIG. 3.

Table 1 illustrates exemplary values which may be employed by system 200 in certain embodiments. According to one or more embodiments, a high voltage level may correspond to a "1" as shown in Table 1. Similarly, a low voltage level may correspond to a "0" as shown in Table 1.

TABLE 1

| Tray | Controller | | | | | | | Motor Driver | |
|---|---|---|---|---|---|---|---|---|---|
| | GPIO pin $210_1$ | Control Circuit | | | | | | TRAY DRIVER+ | TRAY DRIVER− |
| Operation Net Direction | IN_OUT_OPEN_CLOSE Change during operation | Trans. 245 Status | Va | Vb | Vc | Vd | Ve | 270a TRAY_OPEN input | 270b TRAY_CLOSE input |
| Tray is closed | Set to input mode | ON | 0 | 0.7 | 0.97 | 0.68 | 0.45 | 0 | 0 |
| Tray is opened | Set to input mode | ON | 0 | 0.7 | 0.97 | 0.68 | 0.45 | 0 | 0 |
| ↑ Tray being opened | 0 | OFF | 2.4 | 0.36 | 0.36 | 0 | 0 | 1 | 0 |
| ↓ Tray being closed | 1 | ON | 0 | 0.7 | 2.4 | 2.4 | 1.58 | 0 | 1 |

According to another embodiment, control circuit 215 may be configured to provide one or more signals to motor driver circuit 220. As shown in FIG. 2, control circuit 215 includes terminal 240 coupled to GPIO pin $210_1$. In one embodiment, control circuit 215 may include a plurality of circuit elements including, but not limited to, transistor switch 245 and a resistive network. In one embodiment, control circuit 215 may receive supply voltage from terminal 235 which, may be coupled to a voltage input for system 200. Exemplary voltage and logic (i.e., high and low) values are shown in Table 1 for nodes a-e and terminals of control circuit 215 associated with different values of GPIO pin $210_1$ according to one or more embodiments.

According to another embodiment, control circuit 215 may be coupled to switches 230a-230b (e.g., switch 130) by terminals 255a-255b. Based, at least in part, on one or more signals at the terminals 235, 240 and 255a-255b, one or more output signals may be output by terminals 250a-250b of control circuit 215. In that fashion, control circuit 215 can control operation of motor driver 220 based on one or more control signals provided by GPIO pin $210_1$ of control circuit 215. In yet another embodiment, terminals 250a-250b of control circuit 215 may be coupled to terminals 265a-265b of motor driver 220.

Continuing to refer to FIG. 2, motor driver 220 may include a switch network to ground and/or apply voltage to terminals 270a-270b of motor driver 220 according to one embodiment. In another embodiment, the switch network may be comprised of transistor switches arranged as shown in FIG. 2. However, it should be appreciated that other circuit arrangements may be employed by motor driver circuit 220 to activate motor 225. According to an exemplary embodiment, terminals 270a and 270b may assume values to activate motor 225 in a first direction, second direction or not at all as shown in Table 1. As such motor 225 can eject and/or retract tray 260 in relation to a closed position and an open position.

In one embodiment, terminal 270a may present a high voltage signal to a positive terminal of motor 225 to eject tray 260. Alternatively, terminal 270b may present a high voltage signal to a negative terminal of motor 225 to retract tray 260. Additionally, motor 225 may be halted by applying a low voltage and/or grounding terminals 270a-270b.

According to another embodiment, controller 205 may receive at least one input signal from a user by a dedicated terminal or remote signal related to manipulating a tray position. As such, controller 205 may apply one or more signals to GPIO pin $210_1$ to activate opening or closing of tray 260. While not shown in FIG. 2, controller 205 may receive one or more signals via a GPIO pin associated with user input or a user input terminal corresponding to an open/close button associated with tray 260. In yet another embodiment, closing of tray 260 may be initiated by a user pushing the tray. For example, if a user pushes tray 260, when tray 260 is fully opened, switch 230a will open causing terminal 240 to be at a high level. Motor 225 may then be activated to close tray 260 based on the opening of switch 230a.

Figure 3:
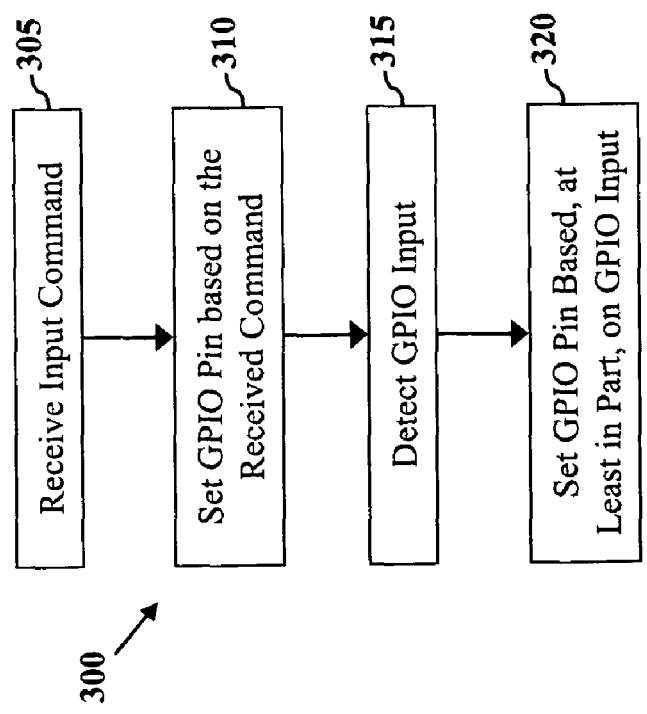
FIG. 3 depicts a process for setting a GPIO pin according to one or more embodiments of the invention.

Referring now to FIG. 3, a process is shown for setting a GPIO pin according to one or more embodiments of the invention. As shown in FIG. 3, process 300 may be executed by a controller (e.g., controller 105 or 205) for setting a GPIO pin (e.g., GPIO pin 110 or $210_1$). Process 300 may be initiated by receiving an input command at block 305. For example, a command may be received by the controller, at block 305, to activate a motor (e.g., motor 125 or 225). According to another embodiment, an input command received at block 305 may relate to opening, or closing, a disc tray of a media player. Based on the received command, the GPIO pin (e.g., GPIO pin 110 or $210_1$) may be set to a particular value at block 310. Exemplary values which may be received by the GPIO pin are shown in Table 1, according to certain embodiments of the invention.

Process 300 continues with detecting one or more signals which may be applied as input to the controller at the GPIO pin at block 315. In one embodiment, input to the controller may be received from a control circuit (e.g., control circuit 115 or 215) coupled to the GPIO pin. According to one embodiment, the GPIO may be set to receive, or output, one or more signals for respective periods of time as will be described in more detail below with respect to FIG. 4. As such, the controller can detect one or more signals received by the GPIO pin for a period of time. The GPIO pin may be set at block 320 based, at least in part, on one or more signals detected. For example, the GPIO pin may be set as an output to provide one of a high, low and floating point output signal.

Figure 4:
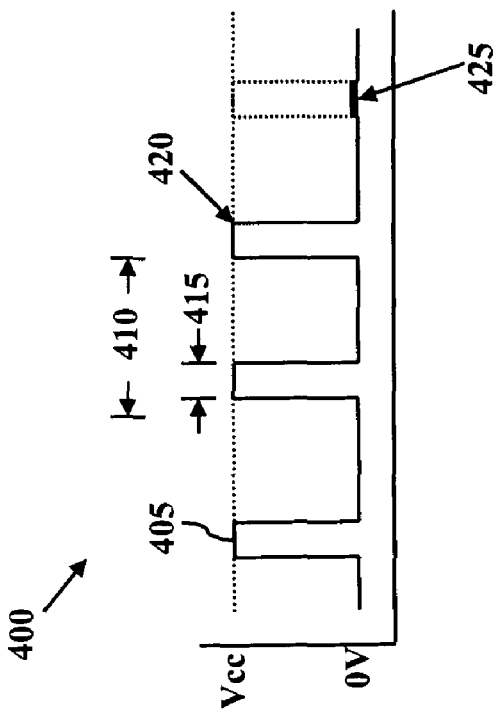
FIG. 4 depicts a timing diagram according to one or more embodiments of the invention.

Referring now to FIG. 4, a timing diagram is shown according to one or more embodiments of the invention. In one embodiment, timing diagram 400 relates to an exemplary signal 405 which may be detected by a controller (e.g., controller 105 or 205) for a GPIO pin (e.g., GPIO 110 or $210_1$) according to one or more embodiments of the invention. The timing signal 405 may relate to input and output periods for the GPIO pin. As shown in FIG. 4, a GPIO pin may be set to receive one or more input signals for an interval of time having a duration 415 for every period 410. In that fashion, the controller can detect one or more signals from a control circuit (e.g., control circuit 115 or 215). In one exemplary embodiment, GPIO pin input duration 415 may be set to receive input for 20 μs (i.e., microseconds) for each period 410 of 20 ms. It should be appreciated that values for time intervals 410 and 415 are exemplary and that other values may be employed. According to another embodiment, it should be appreciate that the controller may activate the motor to continuously while the GPIO pin is set as an input.

In one embodiment, signal 405 relates to voltage received at the GPIO pin when the GPIO pin is set to receive input. As such, signal 405 may relate to a high output value, shown as 420, when a switch (e.g., switch 130 or 230a-230b) is not closed. However, when a switch is closed signal 405 may be pulled down from high level 420 to a low voltage level indicated by 425. In one embodiment, a low level may relate to a tray in the closed, or open, position. Detecting a low voltage level by the controller may prompt the controller to output a signal to stop the motor according to one embodiment. To that end, periods indicated by 410 and 415 may relate to input intervals and periods which may be used by the controller to receive and output data by a single GPIO pin.

Referring now to FIG. 5, a process is shown which may be employed by the controller of FIG. 2 according to one or more embodiments of the invention. According to one embodiment, process 500 may be utilized for opening a tray (e.g., tray 260) using a single GPIO pin (e.g., GPIO 210$_1$) of a controller (e.g., controller 205). Process 500 may be initiated by setting output of the GPIO pin to a low voltage value at block 505. The controller may then wait a predetermined time delay at block 510. In one embodiment, the time delay at block 510 may be for 300 ms. In that fashion the circuit may allow for control circuit elements (e.g., control circuit 215) to stabilize. It may be appreciated however that different values may be employed for the time delay in block 510. The controller may then set the GPIO pin to receive input at block 515.

At decision block 520, the controller can determine the voltage applied to the GPIO pin. When the voltage level is not at a low voltage level ("No" path out of decision block 520) the controller may set the GPIO pin to a output a low voltage at block 525. Process 500 may continue with waiting a time delay at block 530. In one exemplary embodiment, time delay at block 530 may relate to 20 ms. The controller may then set the GPIO pin to receive input in block 515. When the voltage level is at a low voltage ("Yes" path out of decision block 520) the controller may set the GPIO pin to float value to stop operation of the motor and the tray at block 535. According to one embodiment, receiving a low value may relate to a tray (e.g., tray 260) being in an open position. The controller may then wait for a command at block 540.

Referring now to FIG. 6, a process is shown which may be employed by the controller of FIG. 2 according to one or more embodiments of the invention. As shown in FIG. 6, process 600 may be utilized for closing a tray (e.g., tray 260) using a single GPIO pin (e.g., GPIO pin 210$_1$) of a controller (e.g., 205). Process 600 may be initiated by setting output of the GPIO pin to a high voltage value at block 605. The controller may then wait a predetermined time delay at block 610. In one embodiment, the time delay at block 610 may be for 300 ms. In that fashion the circuit may allow for circuit elements to stabilize. It may be appreciated however that different values may be employed for the time delay in block 610. The controller may then set the GPIO pin to receive input at block 615.

At decision block 620, the controller can determine the voltage applied to the GPIO pin. When the voltage level does not relate to a low voltage level ("No" path out of decision block 620) the controller may set the GPIO pin to output a high output at block 625. Process 600 may continue with waiting a time delay 630. In one exemplary embodiment, time delay at block 630 may be approximately 20 ms. The controller may then set the GPIO pin to receive input in block 615. When the voltage level is at a low voltage ("Yes" path out o decision block 620) the controller may set the GPIO pin to a float value to stop operation of the motor and the tray at block 635. According to one embodiment, receiving a low value may relate to a tray (e.g., tray 260) being in a closed position. The controller may then wait for a command at block 640.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A control circuit configured to operate a motor using a single general purpose input/output (GPIO) pin of a controller comprising:
 a first terminal coupled to a GPIO pin of a controller, the first terminal configured to receive and output at least one or more signals; and
 a motor driver circuit output terminal coupled to a motor driver circuit,
 wherein the control circuit is configured to output one or more control signals via the motor driver circuit output terminal to control the motor driver circuit based, at least in part, on one or more signals received from the first terminal.

2. The control circuit of claim 1, further comprising a second terminal coupled to a switch, wherein the first terminal is electrically coupled to the second terminal, such that a voltage level of the first terminal is based, at least in part, on the state of the switch.

3. The control circuit of claim 2, wherein the second terminal comprises an additional terminal coupled to an additional switch such that a voltage level of the first terminal is based, at least in part, on the state of the additional switch.

4. The control circuit of claim 1, wherein the motor driver circuit output terminal comprises two output terminals, each of the motor driver circuit output terminals electrically coupled to the first terminal.

5. The control circuit of claim 4, further comprising a transistor switch electrically coupled to one of the motor driver circuit output terminals.

6. The control circuit of claim 4, wherein one of the motor driver circuit output terminals is electrically coupled to a second terminal, the second terminal coupled to a switch.

7. The control circuit of claim 1, further comprising a network of resistors coupled to at least one of the first terminal, the motor driver circuit output terminal and an input voltage terminal.

8. A system configured to operate a motor using a single general purpose input/output (GPIO) pin of a controller, the system comprising:
 a motor;
 a motor drive circuit coupled to the motor and configured to output one or more signals to activate the motor;
 a controller having a single GPIO pin and configured to output and receive one or more signals to control the motor via the single GPIO pin; and
 a control circuit coupled to the motor drive circuit and the controller, wherein the control circuit is configured to output one more control signals to control the motor driver circuit based, at least in part, on one or more signals received from the GPIO pin of the controller.

9. The system of claim 8, wherein the motor is configured to actuate a mechanical component to a plurality of positions based, at least in part, on one or more controller output signals.

10. The system of claim 8, wherein the motor drive circuit is configured to activate the motor in one of two directions based on control signals received from the control circuit.

11. The system of claim 8, wherein the controller relates to at least one of a microcontroller, application specific integrated circuit (ASIC), field programmable gate array and any type of processor in general.

12. The system of claim 8, wherein the controller is configured to output one or more signals by the single GPIO pin to operate the motor based, at least in part, on a received command.

13. The system of claim 8, wherein the control circuit comprises a plurality of terminals, the control circuit coupled to the controller and motor drive circuit by the plurality of terminals.

14. The system of claim 8, further comprising a switch coupled to the control circuit, the switch coupled to a device to be controlled.

15. The system of claim 8, wherein the controller is configured to operate a tray of a compact disc player, video disc player and any type of media player in general.

16. A method for operating a motor using a single general purpose input/output (GPIO) pin of a controller, the method comprising the acts of:
receiving an input command at the input/output GPIO pin of the controller;
setting the input/output GPIO pin of the controller to output one or more signals based on the received input command;
detecting one or more input signals at the input/output GPIO pin by the controller; and
setting the input/output GPIO pin based, at least in part, on the one or more input signals detected at the input/output GPIO pin.

17. The method of claim 16, wherein setting the GPIO pin of the controller to output one or more signals comprises outputting at least one of a high voltage level, low voltage level and floating point output.

18. The method of claim 16, further comprising setting the GPIO pin of the controller to receive one or more input signals for a predetermined period of time.

19. The method of claim 16, wherein the one or more output signals activate a motor based, at least in part, on a received a command.

20. The method of claim 16, wherein the one or more output signals activate operation of a tray associated with at least one of a compact disc player, video disc player and any type of media player in general.

* * * * *

UNITED STATES PATENT AND TRADEMARK OFFICE
CERTIFICATE OF CORRECTION

PATENT NO. : 8,339,072 B2
APPLICATION NO. : 12/299241
DATED : December 25, 2012
INVENTOR(S) : Lin et al.

It is certified that error appears in the above-identified patent and that said Letters Patent is hereby corrected as shown below:

On the Face Page, in Field (57), under "ABSTRACT", in Column 2, Line 9, delete "one more" and insert -- one or more --, therefor.

In Column 5, Line 53, delete "270aand 270bmay" and insert -- 270a and 270b may --, therefor.

In Column 7, Line 40, delete "to a output" and insert -- to output --, therefor.

In Column 8, Line 5, delete "out o" and insert -- out of --, therefor.

In Column 9, Line 1, in Claim 8, delete "one more" and insert -- one or more --, therefor.

In Column 10, Line 23, in Claim 19, delete "a command." and insert -- command. --, therefor.

Signed and Sealed this
Twenty-sixth Day of March, 2013

Teresa Stanek Rea
*Acting Director of the United States Patent and Trademark Office*